United States Patent
Wolfe (12)

(10) Patent No.: US 12,503,041 B1
(45) Date of Patent: Dec. 23, 2025

(54) MOVEABLE MOUNT ASSEMBLY HAVING TWO PLATES THAT ARE PIVOTALLY MOUNTED WITH RESPECT TO EACH OTHER

(71) Applicant: Kevin Wolfe, Glendale, AZ (US)

(72) Inventor: Kevin Wolfe, Glendale, AZ (US)

( * ) Notice: Subject to any disclaimer, the term of this patent is extended or adjusted under 35 U.S.C. 154(b) by 0 days.

(21) Appl. No.: 19/204,527

(22) Filed: May 10, 2025

(51) Int. Cl.
   *B60Q 1/24* (2006.01)
   *F21S 41/657* (2018.01)

(52) U.S. Cl.
   CPC ............ *B60Q 1/245* (2013.01); *F21S 41/657* (2018.01)

(58) Field of Classification Search
   CPC ............................... B60Q 1/245; F21S 41/657
   USPC .................... 248/298.1, 299.1; 362/382–456
   See application file for complete search history.

(56) References Cited

U.S. PATENT DOCUMENTS

| 368,467 A | * | 8/1887 | Fouts |
| 1,935,246 A | * | 11/1933 | Kirsch ...................... E04G 7/02 403/18 |
| 4,390,929 A | * | 6/1983 | La Fiandra ............. F21V 19/04 362/288 |

FOREIGN PATENT DOCUMENTS

DE            4106560 A1 * 9/1992 .......... A01C 17/006

* cited by examiner

*Primary Examiner* — Robert J May
(74) *Attorney, Agent, or Firm* — Thomas W. Galvani, P.C.; Thomas W. Galvani

(57) ABSTRACT

A moveable mount assembly includes a base plate having a top face and a bottom face, a proximal end and a distal end, and first and second sides. A top plate is mounted to the base plate for movement, the top plate having a top face and an opposed bottom face, a proximal end and an opposed distal end, and a first side and an opposed second side. An actuator is configured to move the top plate with respect to the base plate. The actuator is located beyond the second sides of the both the base and top plates. A channel is formed in the top plate and is configured to guide movement of the top plate with respect to the base plate. A post assembly projects upward from the top face of the base plate located between the distal and proximal ends of the base plate.

19 Claims, 7 Drawing Sheets

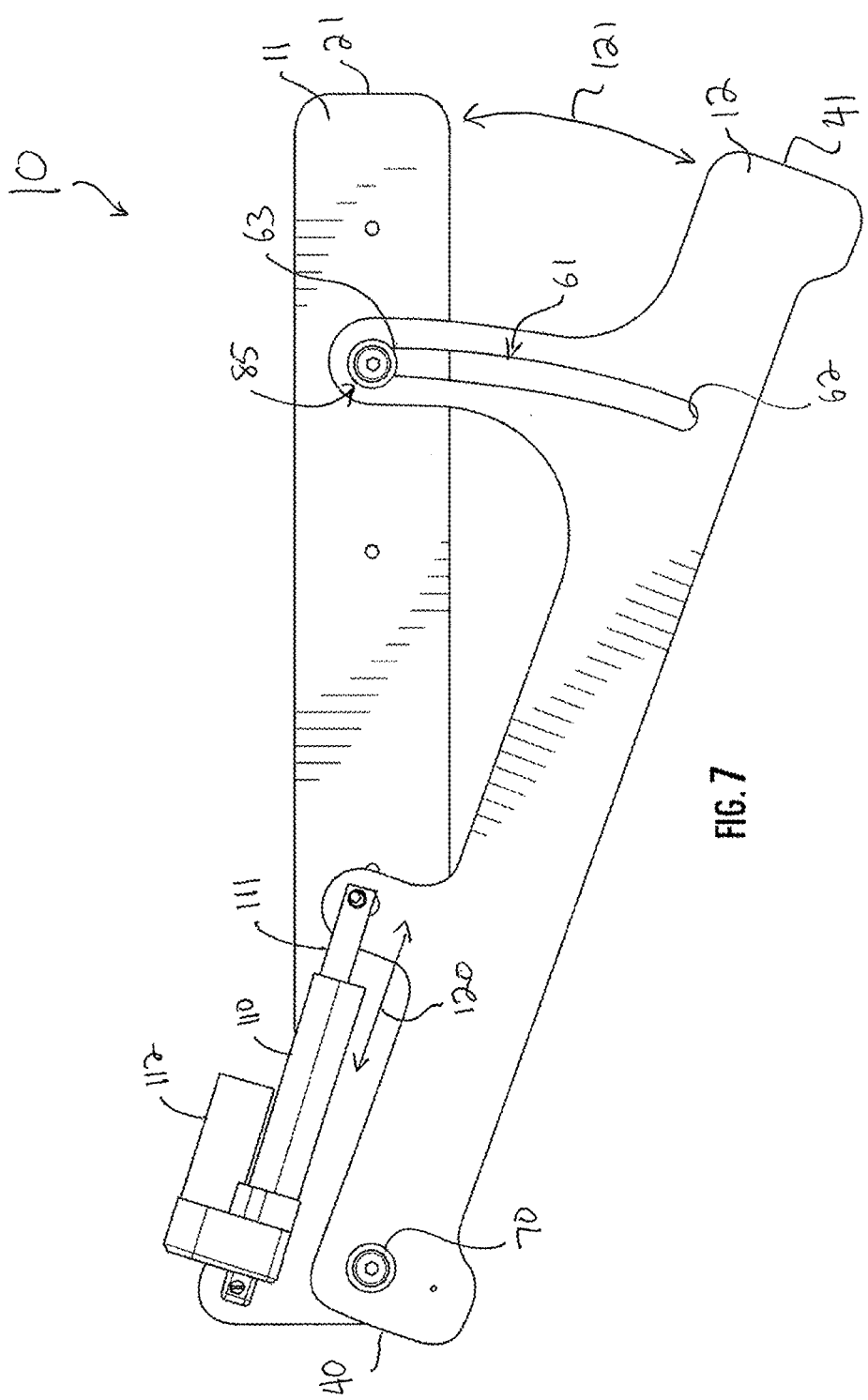

MOVEABLE MOUNT ASSEMBLY HAVING TWO PLATES THAT ARE PIVOTALLY MOUNTED WITH RESPECT TO EACH OTHER

FIELD

The present specification relates generally to mounting devices, and more particularly to devices for mounting lightbars and other accessories to vehicles.

BACKGROUND

Traditional vehicle headlights are primarily designed to illuminate the area directly in front of a vehicle. In cars, for normal road driving where the driver's focus is almost exclusively in the forward direction, this is sufficient. While high-beam modes and auxiliary lighting systems can improve that forward visibility further, they usually do not illuminate the environment to the side of the vehicle.

This deficiency becomes pronounced in specific situations, such as during desert driving and hunting, for example. The inability to see wildlife targets to the side of a vehicle as it is moving through an environment leads to missed tracking and shooting opportunities.

Various solutions have been attempted, such as fixed side-mounted lights and broad beam patterns. However, these approaches often result in scattered light, increased glare, or insufficient coverage of lateral zones. Moreover, existing lighting systems may not adapt well to different environments or user needs, limiting their effectiveness across varied terrains and use cases. There is a need for an improved lighting system.

SUMMARY

In an embodiment, a moveable mount assembly includes a base plate having a top face and a bottom face, a proximal end and a distal end, and first and second sides. A top plate is mounted to the base plate for movement, the top plate having a top face and an opposed bottom face, a proximal end and an opposed distal end, and a first side and an opposed second side. An actuator is configured to move the top plate with respect to the base plate. The actuator is located beyond the second sides of the both the base and top plates. A channel is formed in the top plate and is configured to guide movement of the top plate with respect to the base plate. A post assembly projects upward from the top face of the base plate located between the distal and proximal ends of the base plate.

In another embodiment, a moveable mount assembly includes a base plate having a top face and an opposed bottom face, a proximal end and an opposed distal end, and a first side and an opposed second side. A top plate is mounted to the base plate for movement. The top plate includes a top face and an opposed bottom face, a proximal end and an opposed distal end, and a first side and an opposed second side. An actuator is configured to move the top plate with respect to the base plate. The actuator is located beyond the second sides of the both the base and top plates. A channel is formed in the top plate and is configured to guide movement of the top plate with respect to the base plate. A post assembly projects upward from the top face of the base plate located between the distal and proximal ends of the base plate.

The above provides the reader with a very brief summary of some embodiments described below. Simplifications and omissions are made, and the summary is not intended to limit or define in any way the disclosure. Rather, this brief summary merely introduces the reader to some aspects of some embodiments in preparation for the detailed description that follows.

BRIEF DESCRIPTION OF THE DRAWINGS

Referring to the drawings:

FIG. 7 is a top plan view of the moveable mount assembly in a second position.

DETAILED DESCRIPTION

Figure 1:
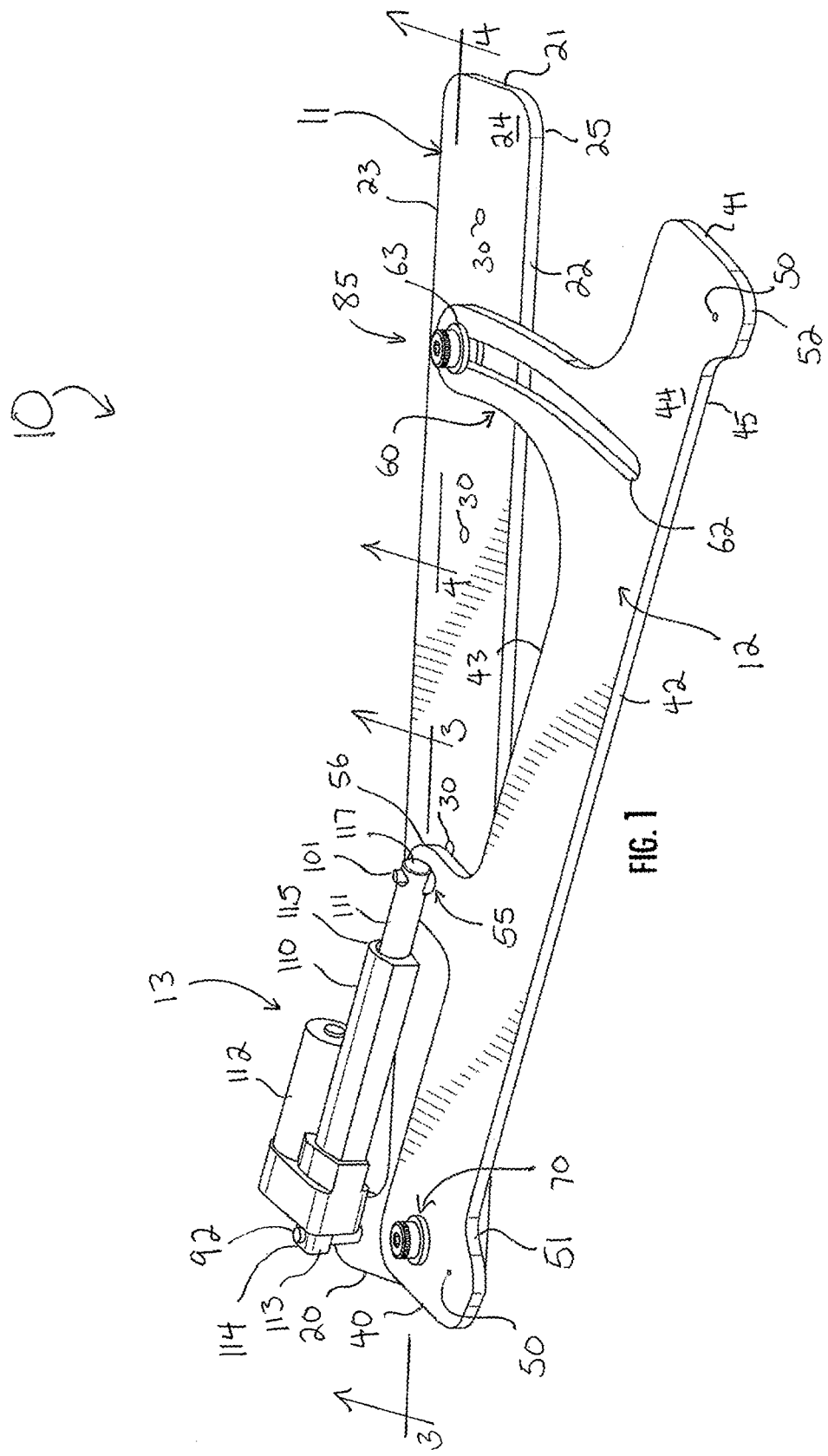
FIG. 1 is a top front perspective view of a moveable mount assembly for lightbars and other accessories.

Reference now is made to the drawings, in which the same reference characters are used throughout the different figures to designate the same elements. Briefly, the embodiments presented herein are preferred exemplary embodiments and are not intended to limit the scope, applicability, or configuration of all possible embodiments, but rather to provide an enabling description for all possible embodiments within the scope and spirit of the specification. Description of these preferred embodiments is generally made with the use of verbs such as "is" and "are" rather than "may," "could," "includes," "comprises," and the like, because the description is made with reference to the drawings presented. One having ordinary skill in the art will understand that changes may be made in the structure, arrangement, number, and function of elements and features without departing from the scope and spirit of the specification. Further, the description may omit certain information which is readily known to one having ordinary skill in the art to prevent crowding the description with detail which is not necessary for enablement. Indeed, the diction used herein is meant to be readable and informational rather than to delineate and limit the specification; therefore, the scope and spirit of the specification should not be limited by the following description and its language choices.

FIG. 1 is a top perspective view of a moveable mount assembly 10 (hereinafter, the "assembly 10") configured to mount a lightbar or other accessory to a vehicle such as car, utility terrain vehicle or side-by-side, off-highway vehicle, boat, or other vehicle or object. The assembly 10 is useful for mounting a variety of accessories, but for simplicity, this description refers to a lightbar as an example of those accessories. The lightbar example is an example only and is not intended to limit the scope of this description. Likewise, the description will refer to the use of the assembly 10 on a car, but it can be mounted to a variety of moving or non-moving objects. Discussion of the car is exemplary only and not intended to limit the scope of this description.

The assembly 10 includes a base plate 11, a top plate 11 mounted to the base plate 11 for pivotal movement, and an actuator 13 for imparting and controlling that pivotal movement. The top plate 11 pivots or swings between a first or stowed position (shown in FIG. 6) and a second or deployed position (shown in FIG. 7). When the assembly 10 is mounted to the roof or roof rails of a car along the side of the car and a lightbar is mounted to the top plate 11, the user can direct light laterally off the car or sweep the light through an arc off the side of the car. This allows the user to illuminate the environment to the side of the car easily or sweep the top plate 11 forward to illuminate the environment still to the side but more toward the front, perhaps to overlap with the area lit by the headlights or other forward-facing lights.

The base plate 11 is a flat, elongate member. It is constructed from a material or combination of materials with characteristics of strength, rigidity, and durability, such as aluminum. It extends from a proximal end 20 to a distal end 21. The proximal and distal ends 20 and 21 are both blunt, and they are roughly parallel to each other and perpendicular to a length extending between the two ends 20 and 21. Generally, but not necessarily, when the assembly 10 is mounted to a car, the distal end 21 will be directed toward the front of the car.

The base plate 11 additionally has a first side 22 and an opposed second side 23. The first side 22 is also identified as an outside edge, and the side 23 as an inside edge, because when the assembly 10 is mounted to a vehicle, the first side 22 is directed toward the outside, beyond the vehicle, and the second side 23 is directed toward the center of the vehicle.

The proximal end 20, distal end 21, first side 22, and second side 23 define a perimeter edge of a body 27 of the base plate 11. The base plate 11 body 27 has a thickness extending between a top face 24 and an opposed bottom face 25. That thickness is shown best in FIG. 3 with reference character 26.

The top face 24 is flat and smooth across its entire expanse between the proximal and distal ends 20 and 21 and between the first and second sides 22 and 23. The bottom face 25 is also flat and smooth across its entire expanse between the proximal and distal ends 20 and 21 and between the first and second sides 22 and 23. Moreover, the top and bottom faces 24 and 25 are parallel to each other. As such, the thickness 26 of the body 27 of the base plate 11 is constant.

Figure 2:
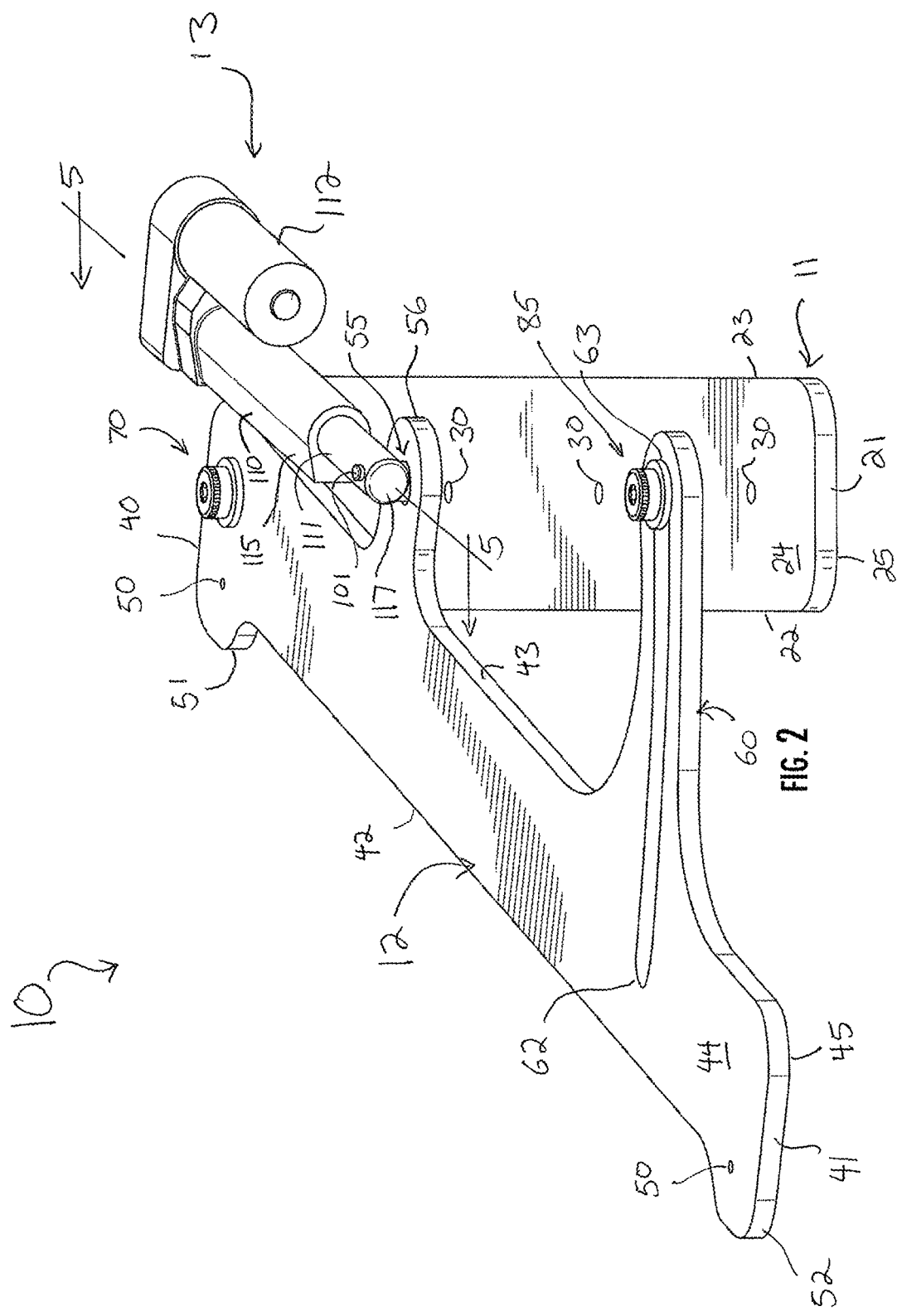
FIG. 2 is a top side perspective view of the moveable mount assembly of FIG. 1.

A number of holes are formed in the body 27 of the base plate 11. The holes have different sizes for different reasons. There are three holes 30, as shown in FIG. 2, formed entirely through the base plate 11 from the top face 24 to the bottom face 25. These holes 30 are small holes and are sized and shaped to receive mounting bolts to attach the base plate 11 to the roof of a vehicle or to the roof rails of the vehicle. The holes 30 are registered in alignment down a center of the base plate 11 and are spaced apart from each other between the proximal and distal ends 20 and 21.

Near the proximal and distal ends 20 and 21, respectively, there are post holes 31 and 32. These post holes 31 and 32 are larger in diameter than the holes 30. Both extend entirely though the body 27 from the top face 24 through to the bottom face 25. The post hole 31, shown in FIG. 3, receives a pivot assembly described later. The post hole 31 has a threaded sidewall so that the pivot assembly can threadably engage with it. It is considered a socket for receiving the pivot assembly. The post hole 31 is located inboard of the proximal end 20 and generally intermediate with respect to the first and second sides 22 and 23.

Figure 4:
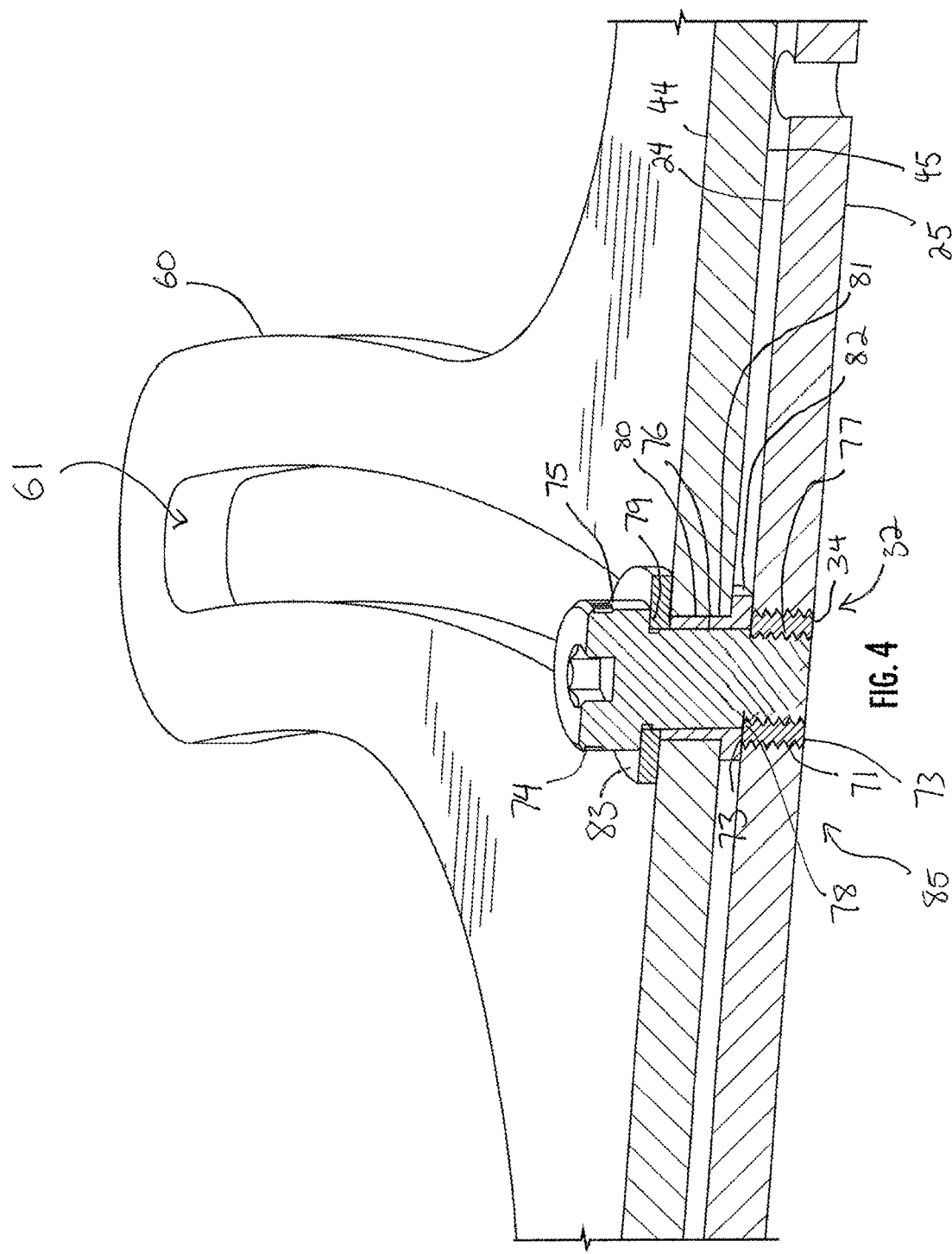
FIG. 4 is a section view of the moveable mount assembly taken along the line 4-4 in FIG. 1.

The post hole 32, shown in FIG. 4, receives a post assembly described later. The post hole 32 has a threaded sidewall so that said post assembly can threadably engage with it. It is considered a socket for receiving the post assembly. The post hole 32 is located well inboard of the distal end 21 and is generally intermediate with respect to the first and second sides 22 and 23.

Figure 3:
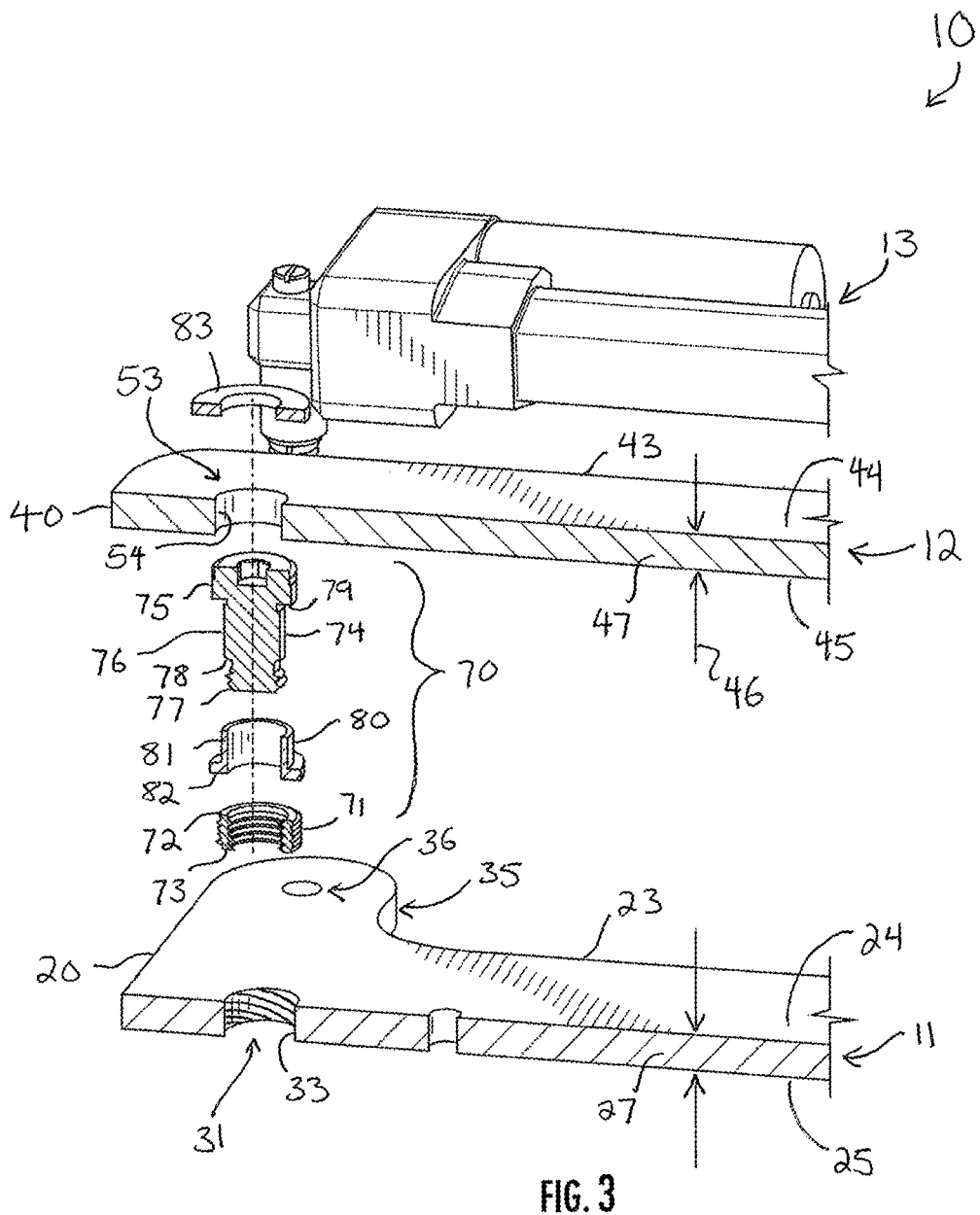
FIG. 3 is an exploded, section view of the moveable mount assembly taken along the line 3-3 in FIG. 1.

As shown in FIG. 3, at the proximal end 20, a foot, or rear base tab 35, is formed integrally as part of the base plate 11. This rear base tab, projects beyond the second side 23 of the base plate 11. The rear base tab 35 is contiguous to the blunt proximal end 20 and has a semicircular curvature extending back to the second side 23. Located generally centrally in the rear base tab 35 is another post hole 36. The post hole 36 extends entirely through the body 27 from the top face 24 to the bottom face 25. The post hole 36 has a threaded sidewall so that another post assembly, also described later, can threadably engage with it. The post hole 36 is considered a socket for receiving that post assembly.

The top plate 12 is a flat, elongate member. It is constructed from a material or combination of materials with characteristics of strength, rigidity, and durability, such as aluminum. It extends from a proximal end 40 to a distal end 41. The proximal and distal ends 40 and 41 are both blunt, and they are roughly parallel to each other and perpendicular to a length extending between the two ends 40 and 41.

The top plate 12 additionally has a first side 42 and an opposed second side 43. The first side 42 is also identified as an outside edge, and the side 43 as an inside edge, because when the assembly 10 is mounted to a vehicle, the first side 42 is directed toward the outside, beyond the vehicle, and the second side 43 is directed toward the center of the vehicle.

The proximal end 40, distal end 41, first side 42, and second side 43 define a perimeter edge of a body 47 of the top plate 12. The top plate 12 body 47 has a thickness extending between a top face 44 and an opposed bottom face 45. That thickness is shown best in FIG. 3 with reference character 46.

The top face 44 is flat and smooth across its entire expanse between the proximal and distal ends 40 and 41 and between the first and second sides 42 and 43. The bottom face 45 is also flat and smooth across its entire expanse between the proximal and distal ends 40 and 41 and between the first and second sides 42 and 43. Moreover, the top and bottom faces 44 and 45 are parallel to each other. As such, the thickness 46 of the body 47 of the top plate 12 is constant.

A few holes are formed in the body 47 of the top plate 12. The holes have different sizes for different reasons. There are two holes 50, as shown in FIGS. 1 and 2, formed entirely through the top plate 12 from the top face 44 to the bottom face 45. These holes 50 are small holes and are sized and shaped to receive mounting bolts to attach a lightbar or other accessory to the top plate 12 on its top face 44.

The holes 50 are registered in alignment with the first side 42 of the top plate 12 and are located in mounting flanges. A first, or proximal, mounting flange 51 is formed integrally as part of the top plate 12, proximate to the proximal end 40. The proximal mounting flange 51 projects beyond the first side 42 of the top plate 12. The flange 51 is contiguous to the blunt proximal end 40 and has an arcuate curvature extending from the end 40 back to the first side 42. The hole 50 in the proximal mounting flange 52 is located centrally therein, registered with the first side 42.

A second, or distal, mounting flange 52 is formed integrally as part of the top plate 12, proximate to the distal end 41. The distal mounting flange 52 projects beyond the first side 42 of the top plate 12. The flange 52 is contiguous to the blunt distal end 41 and has an arcuate curvature extending from the end 41 back to the first side 42. The hole 50 in the distal mounting flange 52 is located centrally therein, registered with the first side 42.

Near the proximal end 40, there is a post hole 53 larger in diameter than the holes 50. The post hole 53 extends entirely through the body 47 from the top face 44 through to the bottom face 45. The post hole 53, shown best in FIG. 3, receives the pivot assembly described below. The post hole 53 has a smooth sidewall 54 so that the top plate 12 can pivot smoothly on the pivot assembly. The post hole 53 is located inboard of the proximal end 40 and generally intermediate with respect to the first and second sides 42 and 43.

Another post hole 55 is formed in a rear top tab 56, as shown in FIGS. 1 and 2. The rear top tab 56 is formed integrally as part of the top plate 12 and projects beyond the second side 43 thereof. The rear top tab 56 is located approximately one-third of the distance from the proximal end 40 to the distal end 41. The post hole 55 is formed centrally in the rear top tab 56 and extends entirely through the top plate 12 from the top face 44 to the bottom face 45. The post hole 55 has a threaded sidewall 57 so that a post assembly, described later, can threadably engage with it. The post hole 55 is considered a socket for receiving that post assembly.

The top plate 12 further includes a track or arm 60 formed integrally to and projecting rearwardly from the top plate 12. The arm 60 projects beyond the second side 43 of the top plate 12 and curves slightly arcuately back toward the proximal end 40 of the top plate 12. The arm 60 is inboard of the distal end 41. Formed in the arm 60 is a channel 61 which receives one of the post assemblies. The channel 61 has a first end 62 and an opposed second end 63 and an arcuate length extending therebetween. The channel 61 has a long continuous sidewall which is smooth such that the post assembly can slide smoothly within the channel 61. The first end 62 of the channel 61 is located generally intermediate with respect to the first and second sides 42 and 43 of the top plate 12.

As mentioned, there are several pivot and post assemblies in the moveable mount assembly 10. Each is now described. Beginning near the proximate ends 20 and 40 in FIG. 3, there is a pivot assembly 70 received by the post hole 31 of the base plate 11 and the post hole 53 of the top plate 12. It is shown in exploded and sectioned view.

The pivot assembly 70 includes a short collar 71 with a top 72 and an opposed bottom 73, and with opposed inner and outer surfaces having internally- and externally-directed threads, respectively. The externally-directed threads of the collar 71 threadably engage with the socket of the post hole 31. The collar 71 is sized such that, when properly seated in the post hole 31, its top 72 is flush with the top face 24 of the base plate 11 and its bottom 73 is flush with the bottom face 25 of the base plate 11.

The pivot assembly 70 further includes a post 74 secured in the collar 71. The post 74 is generally cylindrical and has an enlarged head 75, a body or shank 76 extending downward from the head 75, and a tail 77 below the shank 76. The tail 77 has externally-directed threads and an outer diameter which corresponds to the collar 71, such that the tail 77 is configured to threadably engage with the collar 71. When so engaged, a small shoulder 78 between the tail 77 and the shank 76 is received in contact against the top 72 of the collar 71. The shank 76 projects upwardly and concentrically from the tail 77. The shank 76 is slightly larger in outer diameter than the tail 77. The head 75 projects upwardly and concentrically from the shank 76, and the head 75 is slightly larger in outer diameter than is the shank 76, thereby defining an overhanging shoulder 79 between the head 75 and the shank 76.

The pivot assembly 70 further includes a bushing 80 carried over the shank 76, below the enlarged head 75. The bushing 80 has a cylindrical body 81 and a lower flange 82 projecting radially outward from the bottom of the body 81. The bushing 80 has an inner surface which is smooth so that it can closely receive the shank 76 of the post 74 and rotate freely thereon. The bottom of the bushing 80 is received against the top 72 of the collar 71, and the flange 82 spaces the bottom face 45 of the top plate 12 apart from the top face 24 of the base plate 11. The top of the bushing 80, when properly assembled, is flush with the top face 44 of the top plate 12.

The pivot assembly 70 further includes a washer 83 encircling the shank 76, sitting atop the bushing 80 and just below the shoulder 78 of the head 75. The washer 83 has opposed top and bottom faces. The bottom face is in contact with the top face 44 of the top plate 12. The head 75 of the post 74 fits against the top face of the washer 83. A hex socket in the head 75 allows a user to tighten or loosen the post in the collar 71 and in the post hole 31 to adjust the tightness of the top and base plates 11 and 12 with respect to each other.

The pivot assembly 70 defines a pivot point for the top plate 11 with respect to the base plate 12. The top plate 11 preferably sweeps through an angle of twenty degrees, though this measurement is not critical or limiting. The extent of sweep is controlled, in part, by the interaction of the channel 61 and the post assembly 85 fit therein. That post assembly 85 is shown well in FIG. 4.

The post assembly 85 is identical to the pivot assembly 70. As such, the same reference characters used to identify the various structural elements and features of the pivot assembly 70 are used to also identify the same structural elements and features of the post assembly 85. Moreover, since description of those elements would be duplicative, this specification merely notes that the post assembly 85 includes a collar 71 having a top 72 and bottom 73, a post 74 having a head 75, a shank 76, a tail 77, and shoulders 78 and 79, a bushing 80 having a body 81 and a flange 82, and a washer 83. While FIG. 3 shows the pivot assembly 70 in an exploded configuration in the post hole 31, FIG. 4 shows the post assembly 85 in an assembled configuration in the post hole 32.

The post assembly 85 is secured in the socket of the post hole 32 in the base plate 11, directly below the channel 61. The post assembly 85 projects up from the top face 24 of the base plate 11. The post 74 itself projects into the channel 61, and the body 81 of the bushing 80 slides smoothly against the sidewalls of the channel 61 as the top plate 12 sweeps in pivotal movement over the base plate 11. Moreover, as the top plate 12 moves, its bottom face 45 slides against the top of the flange 82 of the bushing 80, and its top face 44 slides against the underside of the washer 83. All this ensures that the top plate 12 can slide smoothly between the first or stowed position (shown in FIG. 6) and the second or deployed position (shown in FIG. 7). In the first position, the post assembly 85 is located at the first end 62 of the channel 61, and in the second position, the post assembly 85 is located at the second end 63 of the channel 61.

Figure 5:
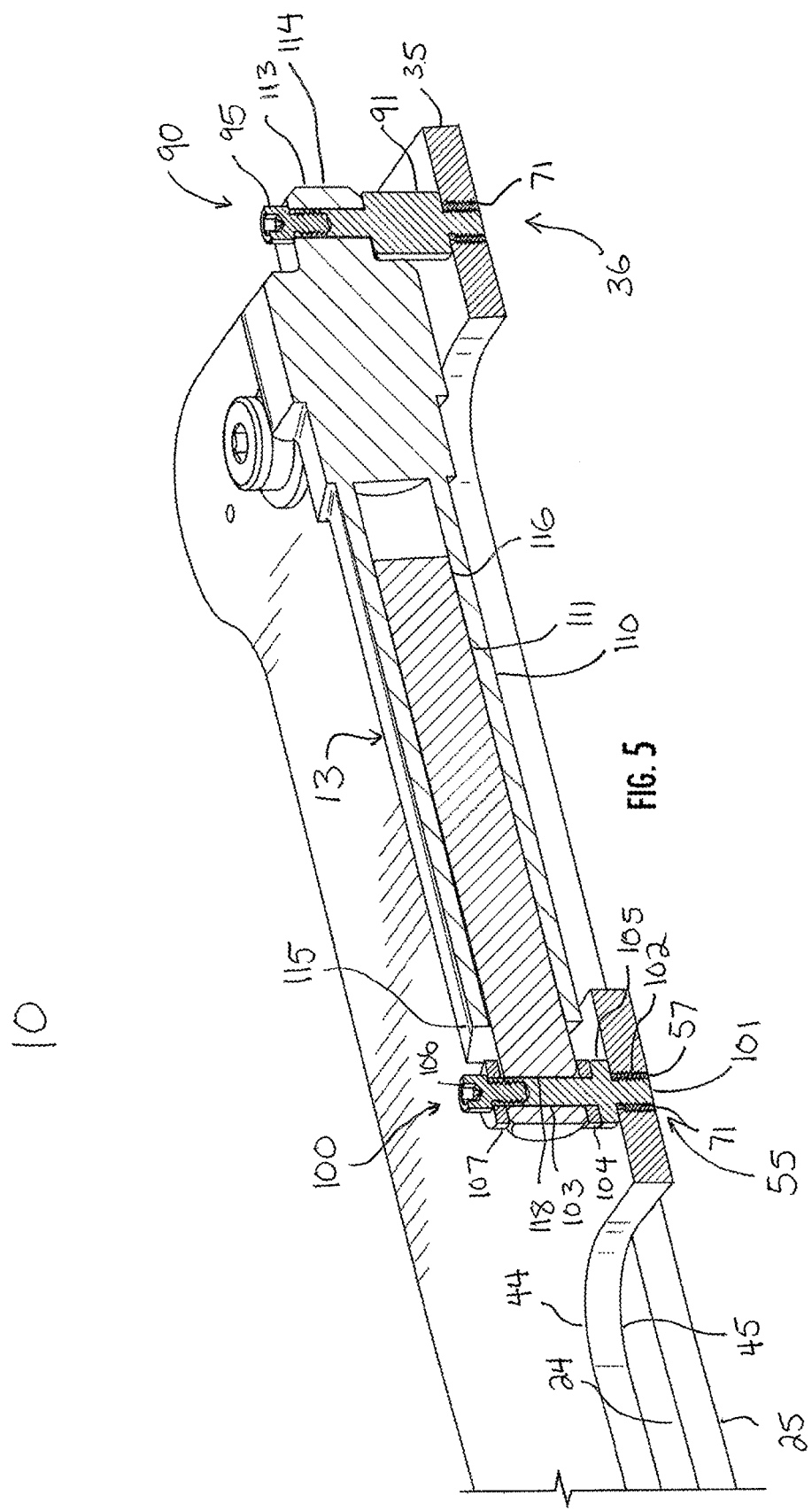
FIG. 5 is a section view of the moveable mount assembly taken along the line 5-5 in FIG. 2.

Two more post assemblies are coupled to the actuator 13. FIG. 5 shows the actuator 13 and those post assemblies. One of the post assemblies 90 is in the post hole 36 formed in the rear base tab 35. This post assembly 90 is also a pivot assembly, because the actuator 13 is mounted to and pivots about this point.

The post assembly 90 includes a collar 71, identical to the collars 71 described above. The collar 71 is threadably engaged in the post hole 36. An upstanding cylindrical post 91 stands above the collar 71 on the top face 24 of the rear base tab 35. The post 91 is threadably engaged with the inwardly-directed threads on the collar 71. The post has a wide diameter above the collar 71 which then decreases to a narrow diameter. A bore in a mounting bracket 113 at the proximal end of the actuator 13 is fit over this narrow diameter. Above the bracket 113, a bolt 95 is threaded into a socket in the top of the post 91. The bolt 95 has a wider diameter than the post 91 and fits over the post 91 and the bracket 113 to keep the bracket 113 engaged on the post 91. The outer surface of the post 91 is a smooth bearing surface allowing rotation between the post 91 and the bracket 113.

The actuator 13 has a length extending from this post assembly 90 to a distal post assembly 100 at its other end. The actuator 13 is pinned to the top plate 12 here for pivotal movement. The post assembly 100 includes a collar 71 threadably secured in the threaded sidewall 57 of the post hole 55, terminating flush with the top face 44 of the top plate 12. A pin 101 is threadably engaged with the collar 71. The pin 101 has a threaded bottom 102 and a smooth shank 103 extending upward from a flange 105 just above the bottom 102. The flange 105 rides along the top face 44 of the top plate 12. A washer 104 fits around the shank 103 and rests against the top face of the flange 105. The actuator 13 has a rod 111 with a smooth bore 118 formed through its end; that bore 118 fits over the smooth shank 103 of the pin 101 such that the two elements can rotate with respect to each other without interference when the actuator extends and retracts the rod. A bolt 106 is threaded into the top of the pin 101 and captures a washer 107 between the bolt 106 and the top of the rod 111.

Referring now to FIGS. 1, 2, and 5, the actuator 13 includes a case or housing 110, a rod 111, and a motor 112. The actuator 13 is preferably an electrical linear actuator, as shown here, but other embodiments are other types of actuators, such as pneumatic and hydraulic ones. In pneumatic and hydraulic actuator embodiments, the motor 112 element, is replaced by a reservoir. The housing 110 has a bracket 113 at its proximal end 114, and the housing 110 extends away from that bracket 113 to an open distal end 115. The bracket 113 is mounted to the post assembly 90 for pivotal movement. The bracket 113 includes a vertical through-hole fit over the post 92 of the post assembly 90. The bracket 113 pivots smoothly on the post 92.

The rod 111 is fit within the housing 110 for reciprocal movement. The rod 111 has a proximal end 116 carried within the housing 110 and an opposed distal end 117 extending out of the housing 110. The distal end 117 is formed with the smooth bore 118 fit over the smooth shank 103 of the pin 101.

Figure 6:
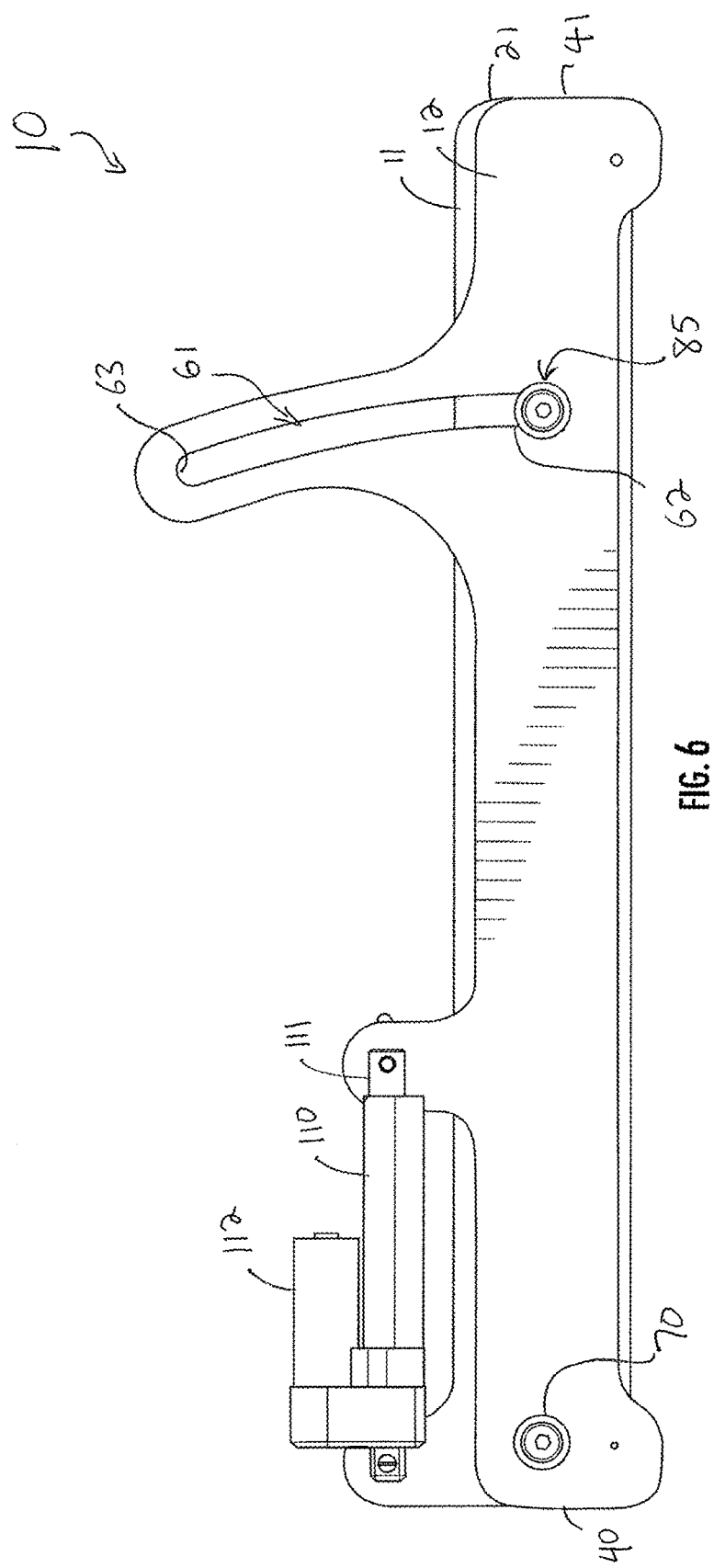
FIG. 6 is a top plan view of the moveable mount assembly in a first position.

When the motor 112 operates in a first direction, the rod 111 extends outwardly from the housing 110, in the direction shown by the double-arrowed line 120 in FIG. 7. Preferably, the motor 112 is operatively coupled to a screw drive within the housing 110 that moves the rod 111. When the assembly 10 is in a first position, as shown in FIG. 6, and the rod 111 begins to extend outwardly, interaction between the post assembly 85 and the channel 61 causes the top plate 12 to begin pivoting from its position, shown in FIG. 6, and sweep toward the second position, shown in FIG. 7. The top plate 12 pivots about the post assembly 70 proximate the proximal end 40 in the direction shown the arcuate double-arrowed line 121 in FIG. 7.

The post assembly 85 slides within the channel 61 as the top plate 12 sweeps through its range. When the post assembly 85 reaches the second end 63 of the channel 61, the motor 112 stop operating. The distal end 41 of the top plate 12 now projects approximately eight inches beyond the distal end 21 of the bottom plate 11. In this second position of the assembly 10, and when the assembly 10 is mounted on the roof and directed outward from the side of the vehicle, a lightbar mounted to the top plate 12 projects a beam of illumination which overlaps with the forwardly-directed headlights of the vehicle. The twenty-degree sweep afforded by the arc of the channel 61 therefore allows the user to illuminate a wide range of the environment outside the vehicle. In other embodiments, of course, the channel 61 has a different sweep range and the top plate 12 can pivot through a smaller or large degree of movement to fit different operating circumstances and needs.

To return the top plate 12 back over the base plate 11 in registration therewith, the user causes the motor 112 to operate in reverse. The rod 111 retracts back into the housing 110, pulling the top plate 12 back to the first position. The post assembly 85 slides back to the first end 62 of the channel 61, and the assembly 10 returns to the first position. The lightbar now illuminates the terrain to the side of the car.

A preferred embodiment is fully and clearly described above so as to enable one having skill in the art to understand, make, and use the same. Those skilled in the art will recognize that modifications may be made to the description above without departing from the spirit of the specification, and that some embodiments include only those elements and features described, or a subset thereof. To the extent that modifications do not depart from the spirit of the specification, they are intended to be included within the scope thereof.

What is claimed is:

1. An assembly comprising:
    a base plate, including a top face and an opposed bottom face, a proximal end and an opposed distal end, and a first side and an opposed second side;
    a top plate mounted to the base plate for movement, the top plate including a top face and an opposed bottom face, a proximal end and an opposed distal end, and a first side and an opposed second side; and
    an actuator configured to move the top plate with respect to the base plate, the actuator located beyond the second sides of both the base and top plates;
    wherein the top plate is mounted to the base plate about a pivot point located between the first and second sides of both the base and top plates; and
    further comprising a channel formed in the top plate, the channel extending from between the first and second sides of the top plate to beyond the second side of the top plate.

2. The assembly of claim 1, wherein the top plate is mounted to the base plate for pivotal movement.

3. The assembly of claim 1, wherein the channel is arcuate.

4. The assembly of claim 3, wherein the channel is located between the distal and proximal ends of the top plate.

5. The assembly of claim 4, wherein the channel rides on a post assembly projecting upward from the top face of the base plate located between the distal and proximal ends of the base plate.

6. The assembly of claim 5, wherein the post assembly comprises:
    a threaded socket formed in the base plate;
    a collar threadably engaged with the threaded socket in the base plate, the collar comprising in-ternally-directed threads;

a post secured in the collar, the post having an enlarged head, a body, and a tail, wherein the tail is threadably engaged with the internally-directed threads of the collar;

a bushing carried over the post, below the enlarged head, wherein the bushing comprises a body encircling the body of the post and a flange, the body of the bushing in contact with the channel and the flange extending laterally outward from the body of the bushing; and a washer below the enlarged head of the post, projecting laterally out so as to ride along the top face of the top plate surrounding the channel.

7. The assembly of claim 1, further comprising first and second mounting flanges at the proximal and distal ends of the top plate, respectively, wherein the first and second mounting flanges each project beyond the first side of the top plate.

8. The assembly of claim 7, wherein the actuator is mounted to a rear base tab projecting beyond the second side of the base plate and a rear top tab projecting beyond the second side of the top plate.

9. The assembly of claim 8, wherein the rear base tab is located proximate the proximal end of the base plate and the rear top tab is located between the proximal and distal ends of the top plate.

10. An assembly comprising:
   a base plate, including a top face and an opposed bottom face, a proximal end and an opposed distal end, and a first side and an opposed second side;
   a top plate mounted to the base plate for movement, the top plate including a top face and an opposed bottom face, a proximal end and an opposed distal end, and a first side and an opposed second side;
   an actuator configured to move the top plate with respect to the base plate, the actuator located beyond the second sides of both the base and top plates;
   a channel formed in the top plate and configured to guide movement of the top plate with respect to the base plate; and
   a post assembly projecting upward from the top face of the base plate located between the distal and proximal ends of the base plate.

11. The assembly of claim 10, wherein the post assembly comprises:
   a threaded socket formed in the base plate;
   a collar threadably engaged with the threaded socket in the base plate, the collar comprising internally-directed threads;
   a post secured in the collar, the post having an enlarged head, a body, and a tail, wherein the tail is threadably engaged with the internally-directed threads of the collar;
   a bushing carried over the post, below the enlarged head, wherein the bushing comprises a body encircling the body of the post and a flange, the body of the bushing in contact with the channel and the flange extending laterally outward from the body of the bushing; and
   a washer below the enlarged head of the post, projecting laterally out so as to ride along the top face of the top plate surrounding the channel.

12. The assembly of claim 11, wherein the flange of the bushing spaces the bottom face of the top plate apart from the top face of the base plate.

13. The assembly of claim 11, wherein the washer is fit between the enlarged head and a top of the bushing.

14. The assembly of claim 10, wherein the top plate is mounted to the base plate for pivotal movement about a pivot point located between the first and second sides of both the base and top plates.

15. The assembly of claim 10, wherein the channel is arcuated and located between the distal and proximal ends of the top plate.

16. The assembly of claim 15, wherein the channel extends from between the first and second sides of the top plate to beyond the second side of the top plate.

17. The assembly of claim 10, further comprising first and second mounting flanges at the proximal and distal ends of the top plate, respectively, wherein the first and second mounting flanges each project beyond the first side of the top plate.

18. The assembly of claim 17, wherein the actuator is mounted to a rear base tab projecting beyond the second side of the base plate and a rear top tab projecting beyond the second side of the top plate.

19. The assembly of claim 18, wherein the rear base tab is located proximate the proximal end of the base plate and the rear top tab is located between the proximal and distal ends of the top plate.

\* \* \* \* \*